United States Patent Office 3,056,650
Patented Oct. 2, 1962

3,056,650
PREPARATION OF FLUORINE COMPOUNDS
William R. Matoush, Colorado Springs, Colo., assignor to International Minerals & Chemical Corporation, a corporation of New York
No Drawing. Filed Jan. 11, 1960, Ser. No. 1,403
13 Claims. (Cl. 23—88)

The present invention generally relates to a method of preparing fluorine compounds from an impure fluorine-containing acid. More particularly, the invention relates to a method of preparing high purity aluminum fluoride from phosphorus contaminated fluosilicic acid obtained as a by-product of a process involving a chemical treatment of phosphorus-containing minerals to make useful phosphatic materials.

Phosphorus-containing minerals such as fluorapatite and phosphate rock are used as raw materials in the manufacture of fertilizers, animal feeds, phosphoric acid and phosphates, as well as other phosphorus-containing materials. Fluorapatite is a mineral which is a phosphate of lime containing small amounts of fluorine. Phosphate rock is a mineral which consists of more or less impure noncrystalline calcium fluorphosphate. These minerals also contain silica as well as other compounds. When such phosphorus-containing minerals are chemically treated with an acid, such as phosphoric acid or sulfuric acid, or mixtures of these acids, which treatment is relatively common in preparing useful materials from these minerals, silicon tetrafluoride is liberated. Silicon tetrafluoride is also liberated when wet process phosphoric acid prepared from phosphate rock or fluorapatite is concentrated by evaporation techniques and when wet process phosphoric acid is defluorinated. The liberated silicon tetrafluoride is usually recovered by absorption in water. When the silicon tetrafluoride is dissolved in water, fluosilicic acid, $H_2SiF_6$, results.

Fluosilicic acid, prepared in this manner, or by other methods, however, contains various impurities such as silica and phosphorus compounds. For some purposes, fluosilicic acid containing such impurities may be used directly, that is without further treatment or purification. For some purposes, however, it is necessary to remove or substantially reduce the concentration of the impurities or to treat the impurity in a manner to lessen any adverse effect which the presence of the impurity may cause. The presence of such impurities in a product produced from such an acid may be very detrimental and may even preclude the intended use of the product.

Cryolite, which is a sodium aluminum fluoride, $Na_3AlF_6$, occurs naturally in a mineral form or may be synthetically prepared. Cryolite was first used industrially for the manufacture of alumina and soda. Large amounts of cryolite are now used in the Hall process for the production of aluminum. The Hall process utilizes a bath of fused cryolite for the electrolyte in which alumina is dissociated by an electric current. The presence of phosphorus in the cryolite has a pronounced deleterious effect on the current efficiency of reduction pots in the aluminum industry. When synthetic cryolite is made from aluminum fluoride containing phosphorus impurities, the cryolite is also contaminated with phosphorus. It is, therefore, desirable to use an aluminum fluoride low in phosphorus content when preparing cryolite therefrom.

The presence of such impurities has also been determined to effect the yield of products prepared from such acids. For example, it has been determined that the yield of aluminum fluoride crystals from an aluminum fluoride-containing solution formed by reacting alumina with impure fluosilicic acid is adversely affected by the presence of certain phosphorus impurities.

It is an object of the present invention to provide a process for preparing aluminum fluoride.

It is a further object of the present invention to provide a process for preparing aluminum fluoride from impure fluosilicic acid.

It is an additional object of the present invention to provide a method of preparing substantially phosphorus-free fluorine compounds from impure fluosilicic acid obtained as a by-product from processes involving a chemical treatment of phosphorus-containing minerals, such as fluorapatite and phosphate rock.

A further object of the invention is to provide a method of preparing substantially phosphorus-free aluminum fluoride using as raw materials an impure fluorine-containing acid and an aluminiferous material.

These and other objects and advantages of the present invention will be apparent from the following detailed description of the invention.

In the specification and claims, it is set forth that phosphorus, and/or fluorine, and/or silicon are present in various of the materials. The phosphorus, and/or fluorine, and/or silicon are, however, not present in elemental form, but are combined with each other or with other elements. Further, the concentration of the phosphorus is given in terms of phosphorus pentoxide, $P_2O_5$, in accordance with accepted usage, although it is to be understood that the phosphorus may be present as other compounds.

Now, in accordance with this invention, there is provided a method for producing aluminum fluoride from an impure fluorine-containing acid which comprises treating an aqueous solution of phosphorus contaminated fluorine-containing acid with a substantially water soluble ferric salt, reacting the treated solution with an aluminum-containing material to form aluminum fluoride, separating the aluminum fluoride-containing solution from the solids in the reaction mass, and crystallizing aluminum fluoride out of the separated solution.

One of the starting materials in the process of the present invention is impure hydrofluoric acid, HF, or impure fluosilicic acid, $H_2SiF_6$, which is contaminated with phosphorus. A mixture of these acids may also be used. A relatively inexpensive source of phosphorus contaminated fluorine-containing acid is the fluosilicic acid obtained as a by-product of the manufacture of fertilizers or animal food from phosphate rock or fluorapatite, or in the concentration of defluorination of wet process phosphoric acid. This fluosilicic acid is obtained by absorbing evolved gases in an aqueous medium such as water or aqueous fluosilicic acid solution. The concentration of the fluosilicic acid depends, inter alia, on the quantity of water fed to the absorber. The absorber effluent usually contains at least 10% $H_2SiF_6$ and seldom exceeds 28% $H_2SiF_6$, but may sometimes be about 30%. Usually an acid concentration within the range of from about 20% to about 28% $H_2SiF_6$ is obtained. The fluosilicic acid effluent from the absorber normally contains phosphorus impurity in an amount above 0.05% $P_2O_5$, usually within the range of from about 0.10% to about 2.0% $P_2O_5$ and more usually contains between about 0.15% and about 0.4% $P_2O_5$ by weight. The phosphorus in the fluosilicic acid is predominantly in the form of phosphate ion.

In accordance with the present invention, a water soluble ferric salt is added to the aqueous solution of fluorine-containing acid to thereby introduce a small amount of ferric ion into the acid solution. The ferric salt is introduced in small amount. The amount of ferric salt added may be from about 0.05% to about 5% by weight of the fluorine-containing acid solution and preferably from about 1% to about 3% by weight. Since the purpose of the ferric salt is to add ferric ion to the acid solution, any suitable substantially water soluble ferric salt which is ionizable in water to provide ferric ion may be used. Suitable ferric salts are ferric sulfate, ferric chloride and ferric nitrate, although, as is apparent to those skilled in the art, other ferric salts of the described character may be used. Ferric sulfate is specifically preferred since it is relatively inexpensive and has produced good results. Ferric sulfate hydrate is preferably added in amount of from 1% to 3% by weight of the acid solution.

By adding the ferric salt to the fluosilicic acid, a substantial portion of the phosphorus or $P_2O_5$ impurity in the acid may be removed from the system prior to the controlled precipitation of aluminum fluoride. The phosphorus impurity complexes with the ferric ion and may remain in solution as a ferric phosphate complex. Some ferric phosphate complex may precipitate from the acid solution, especially at high $P_2O_5$ levels, and the precipitate, along with any other solid impurities in the impure fluosilicic acid, such as silica, may be separated from the liquid by any suitable means, such as filtration or centrifugation, before the acid solution is reacted with the aluminiferous material. The precipitate, when formed, however, is preferably permitted to remain in the acid solution and subsequently removed with the silica which is formed by the reaction of the fluorine-containing acid with the aluminum-containing material. In general, the iron phosphate complex is relatively soluble in fluosilicic acid at the concentrations utilized in this invention and, accordingly, iron phosphate complex precipitates have not been observed. The phosphorus impurity is, however, removed from the system by forming the iron complex form which remains in solution when the aluminum fluoride is precipitated from the solution. By the described means, the aluminum fluoride produced by the process of this invention has a low phosphorus impurity level. The phosphorus level in the aluminum fluoride is usually less than one-half that in the impure fluosilicic acid starting material. The treatment of the phosphorus-contaminated fluosilicic acid with the ferric salt has also been found to increase the yield of aluminum fluoride crystals recovered from an aluminum fluoride solution formed by reacting the fluosilicic acid with alumina.

Bauxite is a preferred aluminiferous material to use in the process of this invention. Alumina, aluminum hydroxide, solid hydrated alumina, and other aluminiferous material may be used, although they are generally more expensive than bauxite. The starting materials may be calcined or uncalcined. Calcined bauxite and uncalcined bauxite have produced good results in the process of this invention. The aluminum-containing material is preferably comminuted to a fine particle size so that mixing with the fluorine-containing acid may be achieved efficiently. In general, bauxite of a mesh size between about 20 mesh and about 200 mesh has been found suitable. Less fine or more finely divided material may, however, be used when desired.

Since a substantially silica-free product is generally desired, it is preferable that the amount of alumina in the aluminiferous material used be sufficient to use all of the fluosilicic acid; that is the alumina is used in at least the stoichiometric amount. It is preferable to use a slight excess of alumina over the stoichiometric equivalent of fluosilicic acid, to insure that all of the fluosilicic acid is used. The alumina is preferably used in from about 5% to about 15% by weight excess over the stoichiometric equivalent.

The reaction of the impure acid, which has been treated with a ferric salt in accordance with this invention, proceeds smoothly at temperatures in the range of from about 120° F. to about 190° F., and the reaction is preferably carried out at a temperature in the range of from about 145° F. to about 165° F. The time necessary for substantially complete reaction at temperatures in the above range varies, interalia, with temperature and particle size of the aluminiferous material. Obviously, a small particle size is preferable for reaction because mixing can be more easily and rapidly accomplished, and a larger surface area of the solids is presented for reaction with the acid. It is, of course, desirable to separate the liquid from the solids at the point of maximum solubility of the aluminum fluoride at the conditions in the reaction mass, thereby obtaining maximum recovery of substantially pure aluminum fluoride. The speed of reaction is particularly important at the higher temperatures where reaction time is shortest because unreacted solids and silica are preferably removed from the resultant solution before aluminum fluoride begins to crystallize. Time for reaction is generally from about 30 minutes to 4 hours and when operating in the preferred range of temperature is from about 1 to 2 hours, although, as above stated, the exact time depends, inter alia, on the particle size, temperature, etc. At lower temperatures, the reaction time is lengthened and at higher temperatures it is shortened. At about 190° F. the reaction time is about 20 minutes.

When the reaction has gone to completion, or preferably when the reaction has proceeded to the point of maximum solubility of aluminum fluoride under the particular operating conditions, solid material comprising excess alumina, precipitated silica, and insoluble impurities, if any, from one or both reactants, is separated from the solution by any suitable means such as filtration, centrifugation, etc.

The resultant substantially solids-free solution contains aluminum fluoride and the solution may be subjected to one or more of a number of procedures for crystallization of aluminum fluoride. Upon standing or ageing the solids-free solution, aluminum fluoride crystallizes out as aluminum fluoride trihydrate. Holding the solution at a temperature within the range of from about 50° F. to about 175° F. speeds up the crystallization of aluminum fluoride trihydrate. Under these temperature conditions, crystallization occurs in from about 15 to about 60 minutes. When ageing the solution without heating, crystallization occurs, depending upon concentration and temperature, in from about 2 to about 6 hours. Crystallization can be induced by seeding the solids-free solution or concentrated solutions with comminuted hydrated aluminum fluoride. Recovery of fluorine in the aluminum fluoride is high, generally from about 50% to about 95%.

As is set forth in copending application Serial No. 604,297, filed August 16, 1956, it has also been determined that the phosphorus level in the solid aluminum fluoride product is reduced when the crystallizing takes place under strongly acidic conditions. This discovery may also be utilized in the present invention to further reduce the phosphorus level in the aluminum fluoride product. The addition of the ferric salt to the fluosilicic acid reduces the amount of phosphate in the aluminum fluoride product; however, in some instances, it may also be desirable to conduct the crystallization of aluminum fluoride under strongly acidic conditions. The use of both the ferric salt and acidic conditions during crystallization is preferable at high $P_2O_5$ concentrations in the fluosilicic acid.

To attain the strongly acidic condition, various acids are added to the reaction mass which results from reacting the fluorine-containing acid with the aluminum-containing material, either prior to or subsequent to filtration, but prior to crystallization. Preferably the acid is added after filtration; that is, it is preferably added to the solids-free metastable solution of aluminum fluoride. As a means of further improving the recovery of aluminum fluoride, the acid is preferably used to wash the solids filtered from the reaction solution and the acid washings added to the resultant substantially solids-free solution to adjust its acidity.

The acid used to adjust the acidity may be any of the strong acids, preferably a strong mineral acid such as sulfuric acid, hydrochloric acid, perchloric acid, nitric acid, etc. as well as mixtures thereof. The amount of acid used will vary with the concentration of the $P_2O_5$ contaminant in the solution treated. The strong acid is added in amounts to raise the normality of the solution to at least 0.1 and below about 5 and preferably to between about 0.5 normal and about 5 normal. In this discussion of normality, a normal solution is defined as one which contains one gram equivalent of the acid in one liter of solution. In the case of a dibasic acid (e.g., $H_2SO_4$) such a normal solution contains one-half of a gram molecular weight of the acid, which is equal to one gram equivalent per liter of solution. The acid is preferably used in an amount below the concentration where aluminum salts of the added acid would be simultaneously precipitated with the aluminum fluoride.

Increase in acidity also has been found to have the effect of reducing the $P_2O_5$ contamination of the crystallized aluminum fluoride. This is demonstrated as follows: After reacting a 25% $H_2SiF_6$ fluosilicic acid with the stoichiometric amount of alumina, the acidity of the resultant solution was adjusted to give various normalities. Products which were crystallized from these solutions were dried at 230° F. to produce aluminum fluoride of approximately the formula $AlF_3 \cdot 3H_2O$ and these aluminum fluoride products were analyzed for $P_2O_5$ content. Results obtained when the normality of the solution was adjusted with concentrated sulfuric acid were as follows.

Acidity: Percent $P_2O_5$
No added acid _____ 0.3
0.5 N _____ 0.074
1.0 N _____ 0.045
5.0 N _____ 0.019

Results when using hydrochloric instead of sulfuric acid were as follows.

Acidity: Percent $P_2O_5$
No added acid _____ 0.25
0.5 N _____ 0.048
1.5 N _____ 0.025

When acidification of the aluminum fluoride-containing solution prior to crystallization is used in addition to the treatment of the fluosilicic acid with the ferric salt, the crystallization of the aluminum fluoride from the solution may be effected in the manner described above for the non-acidified solution. In general, it has been determined that acidified solutions respond to seeding at a slower rate than do solutions to which additions of acid have not been made.

A major amount of aluminum fluoride may be crystallized from reaction solution acidified to 1 normal acidity without seeding. Seeding, however, has been found to increase the amount of aluminum fluoride crystallized in the same period of time.

The aluminum fluoride trihydrate may, when desired, be converted into the anhydrous form by heating; for example, calcining at temperatures in the range of from about 450° F. to about 600° F.

Upon separation of the low phosphate content aluminum fluoride product from the solution, there remains a liquor considerably enriched in phosphate ions and which, in addition, contains some aluminum and fluoride ions. A further recovery of aluminum and fluorine may be made from this solution. A preferred method is to treat this solution with additional ferric salt and to react the treated solution with fresh aluminum-bearing reactant as in the original process. The liquor separated from this secondary reaction mass is preferably not acidified but rather, aluminum fluoride trihydrate is preferably crystallized directly by seeding with the previously precipitated product. The recovery of this secondary product raises the over-all recovery of the fluorine initially present. The secondary product usually has a higher level of phosphorus contamination; however, it may be useful for the same purpose as the primary product or it may be used where the phosphorus impurity is not too critical.

In order to give a fuller understanding of the invention, but with no intention to be limited thereto, the following specific examples are given:

EXAMPLE I

An impure fluosilicic acid solution obtained as a by-product from a phosphate fertilizer and phosphate animal feed plant contained 15 percent $H_2SiF_6$ and 0.5% $P_2O_5$. In a series of tests, which are tabulated below in Table I, this fluosilicic acid was reacted with hydrated alumina present in 5% excess of stoichiometric. The alumina was substantially all of −200 mesh size.

The fluosilicic acid and alumina trihydrate were reacted for one hour at 158° F. with agitation. The resultant slurry was filtered and the filtrate was seeded with aluminum fluoride trihydrate. The seeded solution was agitated at 176° F. for four hours, during which time period crystallization of aluminum fluoride occurred. After the four-hour crystallization period the mixture was filtered and the filter cake analyzed for aluminum fluoride and phosphorus impurity.

In each test, except the so-called blank test, conducted as above-described, ferric sulfate hydrate was added. The ferric sulfate was added as a 28% aqueous solution. The amount of ferric sulfate added was varied and the ferric sulfate was added at different stages as is indicated in Table I.

Table I

| Grams $Fe_2(SO_4)_3 \cdot xH_2O$ per 100 g. of acid | Point of Addition | $AlF_3$ Crystal Yield Percent of Theoretical | Percent $P_2O_5$ in $AlF_3$ |
|---|---|---|---|
| 0 | | 8 | 1.0 |
| 1.4 | After 55 min. reaction | 28 | |
| 1.4 | After 30 min. reaction | 42 | |
| 1.4 | At start of reaction | 31 | |
| 1.4 | To $H_2SiF_6$ | 50 | 0.295 |
| 2.8 | To $H_2SiF_6$ | 66 | 0.11 |

The above results illustrate that a high yield of low phosphorus content aluminum fluoride may be obtained when a ferric salt is added to the fluosilicic acid before adding the alumina. The yield is based on the amount of aluminum fluoride possible from the fluorine in the fluosilicic acid solution.

EXAMPLE II

Another series of tests was conducted with an impure fluosilicic acid solution containing 16.6% $H_2SiF_6$ and 0.43% $P_2O_5$. This series of tests was conducted substantially the same as the tests described in Example I, with ferric sulfate being added to the fluosilicic acid prior to adding the alumina. The ferric sulfate was added as a 28% aqueous solution and the amount was varied as is indicated in Table II. The time of reaction was also varied as indicated in the table.

Table II

| Grams $Fe_2(SO_4)_3 \cdot xH_2O$ per gram of $P_2O_5$ in the Fluosilicic Acid | $AlF_3$ Yield Percent | |
|---|---|---|
| | 1.0 Hr. Reaction | 1.5 Hr. Reaction |
| 0 | 7.8 | 3.6 |
| 0.81 | 15.0 | 15.3 |
| 3.25 | 33.3 | 29.6 |
| 4.88 | 46.6 | |

In another test using 3.25 grams of $Fe_2(SO_4)_3 \cdot xH_2O$ per gram of $P_2O_5$, one hour of reaction, and heavily seeding the filtrate, a yield of 73.9% $AlF_3$ was obtained.

These tests illustrate that adding a ferric salt to the fluosilicic acid substantially increases the yield of aluminum fluoride crystallized from the aluminum fluoride solution formed when the fluosilicic acid is reacted with alumina.

EXAMPLE III

An impure fluosilicic acid solution obtained as a by-product from a phosphate fertilizer and phosphate animal feed plant contained 15% $H_2SiF_6$ and 1.25% $P_2O_5$. To 314.77 grams of the acid, 14.5 grams of a 28% aqueous solution of ferric sulfate hydrate was added. 34.97 grams of finely divided alumina trihydrate were then added to the fluosilicic acid. This amount of alumina represented about 5% excess over the stoichiometric amount required to react with the fluosilicic acid.

The fluosilicic acid and alumina trihydrate were reacted for one hour at 158° F. The resultant slurry was rapidly filtered. The filtrate was a very light yellow clear liquid and had a pH of 3.0. 10.17 grams of 96% $H_2SO_4$ was then added to the filtrate.

The filtrate was then seeded with 30.8 grams of aluminum fluoride trihydrate containing a slight phosphorus impurity (0.037% $P_2O_5$). The seeded solution was agitated for four hours at 176° F., during which time crystallization of aluminum fluoride occurred. The mixture was then rapidly filtered to separate the aluminum fluoride cake from the mother liquor.

The filter cake was a high purity aluminum fluoride product containing phosphorus impurity in the amount of only 0.07% $P_2O_5$. The aluminum fluoride yield was 51.1% based on the amount of fluorine in the impure fluosilicic acid.

The description of the invention utilized specific reference to certain process details; however, it is to be understood that such details are illustrative only and not by way of limitation. Other modifications and equivalents of the invention will be apparent to those skilled in the art from the foregoing description.

This application is a continuation-in-part of copending application Serial No. 604,297, filed August 16, 1956, now U.S. Patent No. 2,920,938, issued January 12, 1960.

Having now fully described and illustrated the invention, what is desired to be secured and claimed by Letters Patent is set forth in the appended claims.

I claim as my invention.

1. A process for the production of aluminum fluoride from an impure fluorine-containing acid which comprises treating aqueous phosphorus contaminated fluorine-containing acid by admixing with a substantially water-soluble ferric salt, reacting the treated acid with aluminum-bearing material to form aluminum fluoride, separating solids from the reaction mass, effecting the crystallization of aluminum fluoride hydrate from the solids-free solution, and recovering aluminum fluoride hydrate crystals from the resultant liquor.

2. A process according to claim 1 wherein said impure fluorine-containing acid comprises impure fluosilicic acid.

3. A process for the production of aluminum fluoride which comprises adding a substantially water-soluble ferric salt to aqueous fluorine-containing acid contaminated with phosphorus in the range of from about 0.1% to about 2.0% by weight of $P_2O_5$, reacting the ferric salt containing acid with an aluminum-bearing material at a temperature within the range of from about 120° F. to about 190° F. to form aluminum fluoride, the amount of aluminum-bearing material being at least the stoichiometric amount for reaction, separating solids from the resultant reaction mass, effecting crystallization of aluminum fluoride trihydrate from the substantially solids-free solution, and recovering the aluminum fluoride trihydrate crystals from the resultant liquor.

4. A process for the production of aluminum fluoride which comprises adding a substantially water-soluble ferric salt to a fluosilicic acid aqueous solution contaminated with phosphorus in the range of from about 0.1% to about 2.0% by weight $P_2O_5$, said ferric salt added in an amount in the range of from about 0.05% to about 5% by weight of said fluosilicic acid solution, reacting the ferric salt containing acid with an aluminum-bearing material at a temperature within the range of from about 120° F. to about 190° F. to form aluminum fluoride, the amount of aluminum-bearing material being at least the stoichiometric amount for reaction, separating solids from the resultant reaction mass, effecting crystallization of aluminum fluoride trihydrate from the substantially solids-free solution, and recovering the aluminum fluoride trihydrate crystals from the resultant liquor.

5. The process of claim 4 wherein said ferric salt comprises ferric sulfate.

6. The process of claim 4 wherein said ferric salt comprises ferric chloride.

7. The process of claim 4 wherein said ferric salt comprises ferric nitrate.

8. A process for the production of aluminum fluoride which comprises adding a substantially water-soluble, substantially ionizable ferric salt to a fluosilicic acid aqueous solution contaminated with phosphorus in the range of from about 0.1% to about 2.0% by weight $P_2O_5$, said ferric salt added in an amount in the range of from about 0.05% to about 5% by weight of said fluosilicic acid solution, subsequently reacting the acid with finely divided bauxite at a temperature within the range of from about 120° F. to about 190° F. to form aluminum fluoride, the amount of aluminum-bearing material being in excess of the stoichiometric amount for reaction, separating solids from the resulting liquid substantially at the point of maximum solubility of aluminum fluoride for the specific reactants and conditions employed, effecting crystallization of aluminum fluoride trihydrate from the substantially solids-free solution, and recovering the aluminum fluoride trihydrate crystals from the resultant liquor.

9. The process of claim 8 wherein said ferric salt comprises ferric sulfate.

10. A process for the production of aluminum fluoride from an impure fluorine-containing acid which comprises treating aqueous phophorus contaminated fluorine-containing acid by admixing with a substantially water-soluble ferric salt, acidifying the treated acid by the addition of a strong acid, reacting said acidified fluorine-containing acid with aluminum-bearing material to form aluminum fluoride, separating solids from the reaction mass, effecting the crystallization of aluminum fluoride trihydrate from the solids free solution which has been acidified, and recovering aluminum trihydrate crystals from the resultant liquor.

11. A process for the manufacture of aluminum fluoride low in phosphate content from impure fluorine-containing acids which comprises adding to an aqueous solution of phosphate-contaminated fluorine-containing acid an amount of water soluble ferric salt which is between about 1% and about 3% by weight of the aqueous solution, separating precipitated solids, admixing with the solids-free aqueous solution comminuted alumina, the amount of added alumina being at least the stoichiometric equivalent amount for reaction, adjusting the acidity of the admixture with mineral acid to an acid normality in the range between about 0.5 normal and about 5 normal, separating solids from the solution of reaction products, effecting the crystallization of aluminum fluoride trihydrate from the solids-free solution, and recovering the aluminum fluoride trihydrate crystal product from the resultant liquor.

12. The process of claim 11 wherein said water soluble ferric salt is ferric sulfate hydrate.

13. In a process for the production of aluminum fluoride from an impure aqueous phosphorus contaminated fluorine containing acid wherein said acid is reacted with an aluminum-bearing material at a temperature in the range between about 120 and about 190° F. to form aluminum fluoride, the solids separated from the reaction mass and aluminum fluoride hydrate crystallized and recovered from the solids free solution, the improvement which comprises admixing with said impure acid a small amount, in the range of from about 0.05% to about 5% by weight of said acid solution, of a water soluble ferric salt.

References Cited in the file of this patent

UNITED STATES PATENTS

| | | |
|---|---|---|
| 1,403,183 | Milligan | Jan. 10, 1922 |
| 1,797,994 | Morrow | Mar. 24, 1931 |
| 2,063,029 | Coleman | Dec. 8, 1936 |
| 2,414,974 | Nielsen | Jan. 28, 1947 |
| 2,780,524 | Gloss et al. | Feb. 5, 1957 |
| 2,842,426 | Glocker | July 8, 1958 |
| 2,916,352 | Fitch et al. | Dec. 8, 1959 |
| 2,920,938 | Matoush | Jan. 12, 1960 |

FOREIGN PATENTS

| | | |
|---|---|---|
| 15,083 | Great Britain | of 1892 |
| 621,067 | France | May 4, 1927 |